United States Patent
Kline et al.

(10) Patent No.: US 8,131,993 B2
(45) Date of Patent: *Mar. 6, 2012

(54) SYSTEM AND METHOD FOR A COMMERCIAL MULTIMEDIA RENTAL AND DISTRIBUTION SYSTEM

(75) Inventors: Paul A. Kline, Gaithersburg, MD (US); Allan M. Weinstein, Potomac, MD (US); David J. Weinstein, Potomac, MD (US); Jon L. Roberts, Great Falls, VA (US); Sawant Nitin, Gaithersburg, MD (US)

(73) Assignee: Sharestream, LLC, Washington, DC (US)

( * ) Notice: Subject to any disclaimer, the term of this patent is extended or adjusted under 35 U.S.C. 154(b) by 1142 days.

This patent is subject to a terminal disclaimer.

(21) Appl. No.: 11/764,438

(22) Filed: Jun. 18, 2007

(65) Prior Publication Data

US 2008/0288770 A1   Nov. 20, 2008

Related U.S. Application Data

(63) Continuation-in-part of application No. 10/155,582, filed on May 23, 2002, now Pat. No. 7,233,668.

(60) Provisional application No. 60/293,364, filed on May 23, 2001.

(51) Int. Cl.
*H04L 9/00* (2006.01)
*G06F 21/00* (2006.01)

(52) U.S. Cl. ......... 713/150; 713/189; 713/193; 726/2; 726/7; 726/27; 726/29; 705/71; 705/310; 705/901; 705/907; 709/203; 380/277

(58) Field of Classification Search .............. 713/150, 713/168, 176, 189, 193; 726/2, 7, 27, 29, 726/6; 705/50, 71, 307, 310, 901, 907, 911; 380/201, 255, 258, 277; 725/25, 31; 709/203
See application file for complete search history.

(56) References Cited

U.S. PATENT DOCUMENTS

| 5,629,980 | A |   | 5/1997  | Stefik et al. |
|-----------|---|---|---------|---------------|
| 5,784,463 | A | * | 7/1998  | Chen et al. ............ 713/171 |
| 5,963,915 | A |   | 10/1999 | Kirsch        |

(Continued)

FOREIGN PATENT DOCUMENTS

WO   WO-00/08909   2/2000

(Continued)

OTHER PUBLICATIONS

Dvorak. Breakthrough: EPR introduces first true electronic rights system. PR Newswire, New York, Oct. 31, 1995.

*Primary Examiner* — Nasser Moazzami
*Assistant Examiner* — Shanto M Abedin
(74) *Attorney, Agent, or Firm* — Birch, Stewart, Kolasch & Birch, LLP

(57) ABSTRACT

A system and method for securing intellectual property rights in distributed intellectual property. Rights are granted and policed in electronically distributed intellectual property. Use limitations are established by agreement by the content provider and the client. The use limitations are reflected in time-based, usage-based and player based component codes that are used to determine if the client is entitled to use the intellectual property. Intellectual property is protected from unauthorized use by encrypting the intellectual property with a key created from some or all of the component codes. As the component codes are known to both the client and the content provider, no key exchange is required.

21 Claims, 6 Drawing Sheets

U.S. PATENT DOCUMENTS

| | | |
|---|---|---|
| 5,991,399 A | 11/1999 | Graunke et al. |
| 6,000,832 A | 12/1999 | Franklin et al. |
| 6,119,229 A | 9/2000 | Martinez et al. |
| 6,199,113 B1 | 3/2001 | Alegre et al. |
| 6,314,409 B2 | 11/2001 | Schneck et al. |
| 6,332,025 B2 * | 12/2001 | Takahashi et al. ............ 380/281 |
| 6,681,017 B1 * | 1/2004 | Matias et al. ................. 380/277 |
| 6,836,845 B1 * | 12/2004 | Lennie et al. ................. 713/181 |
| 6,941,454 B1 * | 9/2005 | Spraggs ........................ 713/150 |
| 6,985,953 B1 * | 1/2006 | Sandhu et al. ................ 709/229 |
| 7,145,492 B2 * | 12/2006 | Hirano et al. ................. 341/143 |
| 7,233,668 B2 * | 6/2007 | Weinstein et al. ............. 380/201 |
| 7,257,844 B2 * | 8/2007 | Woodward ...................... 726/31 |
| 2001/0000709 A1 * | 5/2001 | Takahashi et al. ............ 380/277 |
| 2001/0005446 A1 | 6/2001 | Uchikoga |
| 2002/0124100 A1 * | 9/2002 | Adams ........................... 709/232 |
| 2002/0129235 A1 * | 9/2002 | Okamoto et al. ............. 713/150 |
| 2002/0178370 A1 | 11/2002 | Gurevich et al. |

FOREIGN PATENT DOCUMENTS

WO     WO-01/13310 A1     2/2001

* cited by examiner

SYSTEM AND METHOD FOR A COMMERCIAL MULTIMEDIA RENTAL AND DISTRIBUTION SYSTEM

RELATED APPLICATIONS

This application is a continuation in part application of application Ser. No. 10/155,582 filed May 23, 2002 now U.S. Pat. No. 7,233,668. This application claims the benefit of the U.S. Provisional Application No. 60/293,364, filed May 23, 2001. The Ser. No. 10/155,582 application and the 60/293,364 application are incorporated herein in their entireties for all purposes.

BACKGROUND

The present invention relates to distribution on demand of multimedia content over a network, and in particular, to a system and method for securing intellectual property rights in distributed intellectual property.

Intellectual property such as software, games, music, video and books (collectively, "multimedia content") are widely available through a variety of distribution means. Increasingly, delivery is made via a network such as the Internet. Typically, a client using an access device that is configured to "play" multimedia content (the access device herein referred to as a "player") connects to the network and downloads a multimedia content file to the player. The client pays a license fee that is set by the owner or distributor of the multimedia content, which fee may be time or use based. For purposes of this disclosure, "play" and "playing" include: listen and listening to; view and viewing; play and playing (such as an electronic game); execute and executing; and any other form of use and using the multimedia content of the product. A "player" is the device used for playing the work. This "player" might be a personal computer, a set-top box used to receive cable or satellite programming, or any number of devices configured to play multimedia content.

While the use of the Internet as a distribution means has many advantages, the Internet can also be used to provide unauthorized access to intellectual property on a world-wide scale thereby denying the owner of the property control over its use. This unauthorized use or distribution is popularly referred to as "piracy".

A number of approaches have been taken in an attempt to limit piracy of multimedia content distributed over the Internet. The most common approach is to require the client to establish an account and a payment method with a content provider. Once the account is established, the client orders the multimedia content and receives the multimedia content from a remote location over the Internet. The client then uses or plays the multimedia content under the terms of a usage license granted to the client. The problem with this approach is that it does not secure the intellectual property rights of the multimedia content after distribution to the client.

To a limited extent, this problem is addressed by using digital watermarking to trace the original procurer of works that have been pirated. Additionally, digital rights management (DRM), based on digital watermark technology, limits the ability of the client to make copies of the multimedia content and the number of times multimedia content can may be used or played. However, neither of these approaches assures that the multimedia content is not accessed or copied without authorization or that the owner of the multimedia content will receive fair compensation for the use of the multimedia content distributed over the Internet.

Encrypting the multimedia content improves the ability of the owner to protect the multimedia content from unauthorized access and use, provided that the imposition of key technology does not adversely affect the client's experience in purchasing a license to use the multimedia content. If the client is expected to pay to use or play multimedia content, it is important that the creation and exchange of keys be simple and reliable. Otherwise, the client may seek alternative multimedia content or alternative sources for the multimedia content of the owner.

What is required is an inexpensive means for protecting the intellectual property rights of the owner of multimedia content with a minimal amount of additional intrusions or steps affecting the digital representation of the content.

SUMMARY

It is an aspect of various embodiments to use encryption component codes of any type to secure the intellectual property holder's rights when the multimedia content is delivered digitally over a network.

Another aspect of various embodiments is to use a cipher such as AES to encrypt multimedia content to be delivered digitally.

Yet another aspect of various embodiments is to use a cipher such as AES to secure financial transactions between the multimedia content provider and the client requesting digital delivery of the multimedia content.

Still another aspect of various embodiments is to use a cryptographic protocol such as SSL to provide initial authentication of client and server.

Still another aspect of various embodiments is to implement the decryption module within the player such that, at no time is decrypted multimedia stored in a shared memory accessible by an external process.

Still another aspect of embodiment to provide anti-piracy measures within the multimedia content delivered digitally to a client.

It is still another aspect of embodiments to used selected portions of multimedia content to differentiate individual copies that are transmitted to a client.

It is still another aspect of embodiment to introduce errors into a recording of multimedia content to uniquely identify a particular recording thereby tracking that recording and any copies thereof.

Another aspect of embodiment to employ a private encryption key system in a symmetric manner to secure client data and to secure multimedia content from unauthorized use.

A further aspect of embodiments is to limit playback of multimedia content by virtue of time and date codes used in the private key.

These and other aspects of the various embodiments disclosed herein will become apparent from a review of the general and detailed descriptions that follow. In the present invention, the digital representation of multimedia content is encoded by the multimedia content provider using an encryption method that relies on a private key. In order for a client to use or play multimedia content, the multimedia content must be decrypted by the client using the same key used in the encryption process. Thus, the client and the multimedia content provider share the private key.

In the present invention, the shared private key used to encrypt and decrypt the multimedia content is constructed from component codes that are available at the client's player. In the preferred embodiment of the present invention, these component codes comprise a billing code, a time and date code, a computer or player specific code (which will be referred to as "computer specific code") and a last cookie code, although the invention is not limited to such components. Each of the components codes used to construct the private key must be present at the client's player or the client cannot decrypt the multimedia content.

The present invention also uses the component codes from the client's facilities to enforce the use license. A checking algorithm is incorporated in entitlement and control logic that is operated by a player. The time and date component code is used with the checking algorithm to enforce time limitations where the use license is for a term period by allowing the entitlement and control logic to determine if the term period of the use license has expired.

Cookies are files stored on the client's player and are client specific. Cookies capture data about the client, transactions with the web server and the client's multimedia content player. In one embodiment of the present invention, the last cookie code component is used for both constructing the decryption key and for enforcing utilization restrictions. In particular, the number of plays or other conditions may be imbedded in the last cookie code component. As play occurs, the utilization count is decremented. As additional fees are collected or playtime is otherwise awarded a client, the utilization count is incremented. Once a count level is achieved, as determined by the entitlement and control logic, no further use of the program is permitted until further usage rights are purchased by the client.

In yet another embodiment of the present invention, the computer specific code is used to identify a particular player. For example, elements specific to a player may include serial number, random noise generated by components of the player, network address, media access control (MAC) address, ownership name, drive volume name and registry creation date. These elements are not meant as a limitation but are illustrative only. Using a computer specific code component, the decryption code can be restricted to execute only at a single play location.

The billing code component is also used to enforce the terms of the license. Further, an account may be established and stored within the player and debited as the work is used.

DETAILED DESCRIPTION

In the discussion that follows, the term "client" is used to refer to a logical component of a client-server model and to a "user" of the client component. The disclosure has been presented so that one skilled in the art may discern the intended meaning from the context of the description.

Figure 1:
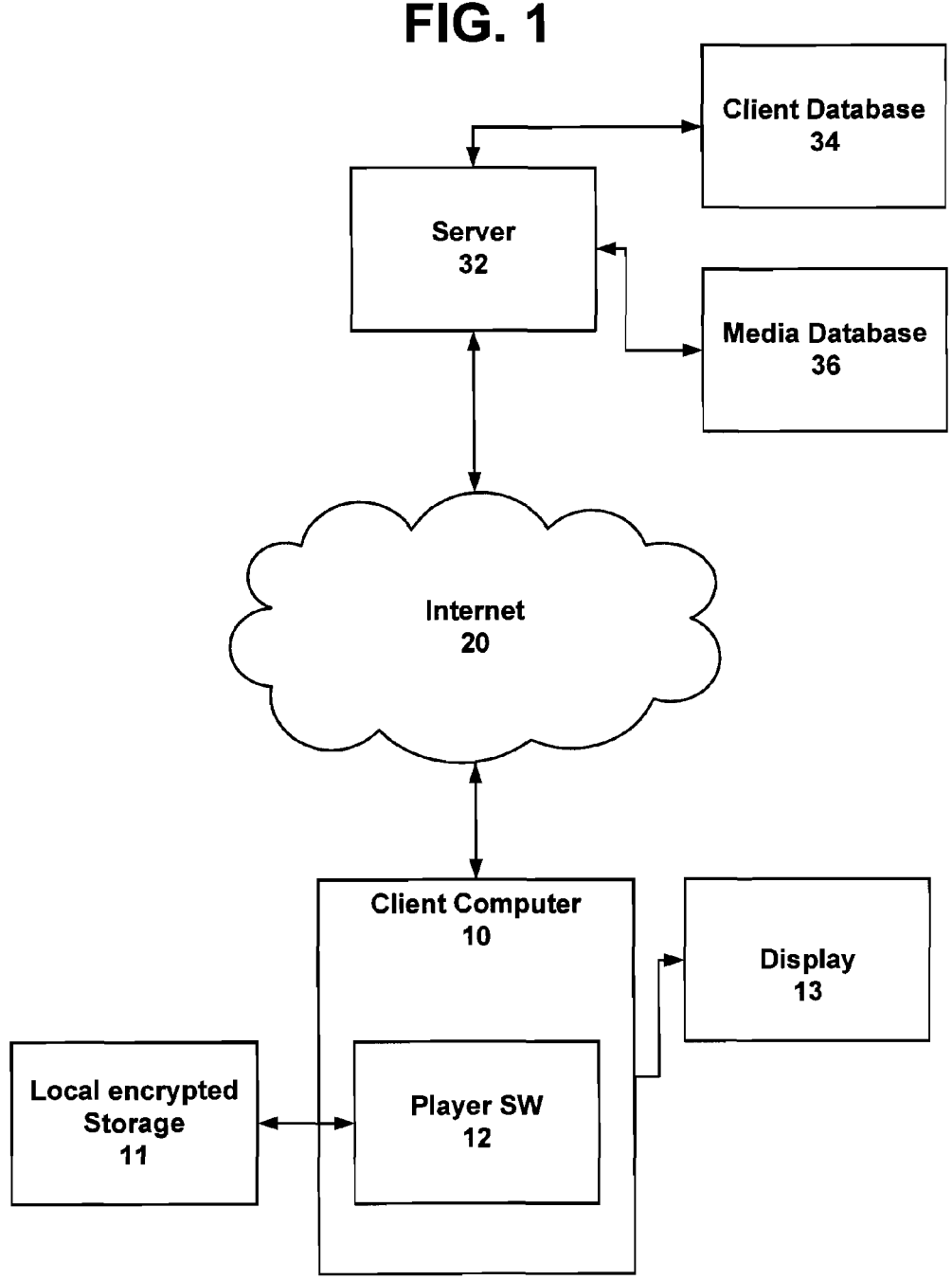
FIG. 1 illustrates the components of the multimedia distribution system.

Referring first to FIG. 1, the interconnectivity of the client's facility and the content provider's facility is illustrated. Located at a client computer 10 is a player software 12 configured to play or use multimedia content. The client computer 10 is connected to local storage 11 for encrypted media that is downloaded from a content provider. As illustrated in FIG. 1, local storage 11 is logically separated from local computer 10. In an alternate embodiment, local storage 11 may be integrated with client computer 10 or represent a separate file on client computer 10 where encrypted media may be stored and accessed by the player software 12. The client computer 10 is connected to a network 20, in this case illustrating the Internet. Also connected to the network 20 is a "content provider" server 32 at the content provider's facility.

By way of example and not as a limitation, a client computer 10 may be a personal computer manufactured by IBM, Dell, or HP, a personal data assistant (PDA), a "set-top box" used to obtain programming from a cable or satellite service provider, a "smart" television, or any device capable of connecting to a network and receiving and operating the entitlement and control logic. As would be apparent to one skilled in the art of the present invention, it is well within the state of the art to modify currently available devices (e.g., VCRs, MP3 players, CD players) to perform the functions of client computer 10.

Similarly, the network depicted in FIG. 1 is the Internet, but the invention is not so limited. The network may comprise a plurality of interconnected networks, wired and wireless. By way of illustration, the network could a cable-base network or a satellite-based network or an intranet supported by a hotel or apartment complex.

The content provider's facility has a client database 34 as well as content database 36. The client establishes an account with the content provider as a preliminary transaction. The client's account data is confirmed or established and updated in the client database 34. A client's account data includes billing information and a payment means. In the preferred embodiment the payment means is a credit card. In another embodiment, payment is made through an ACH transfer. In still another embodiment, the client pays an amount into an account that is debited based on usage of multimedia content.

The data held in client database 34 is encrypted using a shared private key so as to secure the client's information and privacy. The shared private key is constructed from component codes that comprise information retrieved from the client's player software 12 and data filled in by the client. Based on this shared private key, client data is sent encoded and secure to the content provider's server 32. In the preferred embodiment, the shared private key is a DES key, but this is not meant as a limitation. Updates to the client's record, including current activity, are made at the client database 34.

Figure 2:
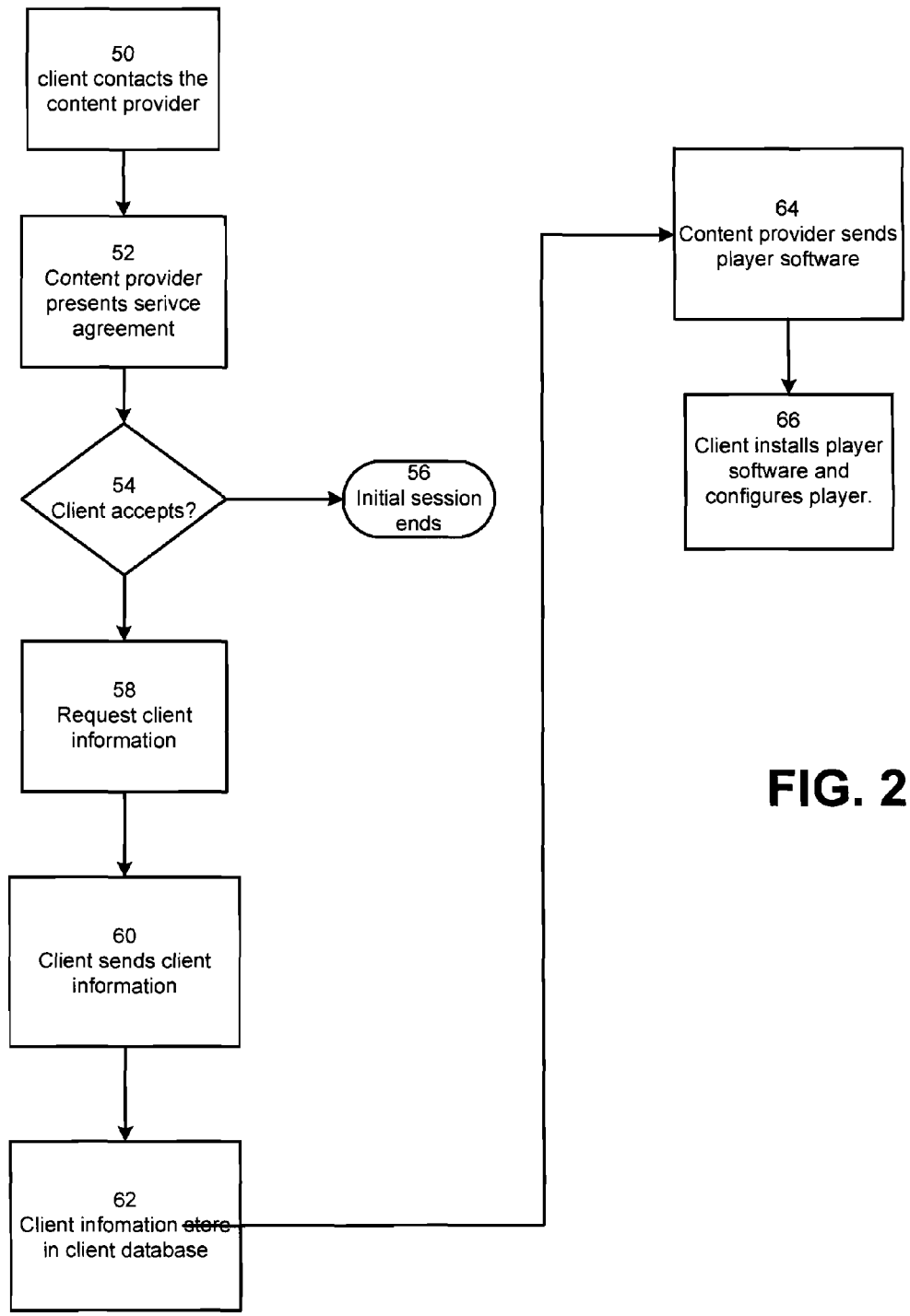
FIG. 2 illustrates the establishment of a relationship between the client and media content provider.

Before the client can obtain multimedia content from the content provider, the client must be known to the content provider. Referring to FIG. 2, the client authenticates itself with the content provider by passing a username and password over a SSL enabled network connection 50. SSL (Secure Sockets Layer) is the standard security technology for establishing an encrypted link between a web server and a browser. This link ensures that all data passed between the web server and browsers remain private and integral. SSL is an industry standard and is used in the protection of online transactions between clients and servers. SSL is a generally accepted protocol developed by Netscape for transmitting private documents via the Internet. SSL uses a cryptographic system that uses two keys to encrypt data—a public key known to everyone and a private or secret key known only to the recipient of the message.

In the preferred embodiment, this initial contact is made over the network between the player software 12 and the content provider's server 32 as illustrated in FIG. 1. However, other means may be used for this initial contact without exceeding the scope of the present invention. For example, the contact between the client and the content provider may be established by telephone, email, in writing, or other communications media. Once the initial contact is made, the content provider presents a service agreement 52 to the client for acceptance 54. If the terms are not acceptable to the client, the contact is terminated 56. If the client accepts the terms, the content provider requests client information 58. In the preferred embodiment, client information comprises a billing code associated with a payment means selected by the client and a computer specific code that uniquely identifies the player software 12. In the event the client does not know the computer specific code associated with the player software 12, the content provider provides instructions to the client on how to determine the computer specific code. In another embodiment of the present invention, the content provider determines the computer specific code of the player software 12 remotely. The client then forwards the client information to the content provider 60 and content provider stores the client information in the client database 62.

The content provider then sends to the client computer (see, FIG. 1, element 10) player software (see, FIG. 1, element 12) 64 comprising entitlement and control logic, an encryption/decryption engine, a first cookie, and means to check for compliance with the terms of the license associated with multimedia content downloaded from the content provider's server. The client installs and configures the player software 66 and the initial session ends.

As would be apparent to one skilled in the art of the present invention, the steps of the initial session can be accomplished in a variety of ways. For example, the exchange of identity information and the delivery of the player software may be conducted off-line. The player software may be integrated in the player or purchased at a software retailer. The player software may be distributed free to consumers by the content provider as a means of inviting consumers to use the services of the content provider. These and other variations means of implementing the initial session are considered within the scope of the present invention.

With the player software installed and configured, the client computer 10 is ready to make a request for multimedia content. Referring again to FIG. 1, the requested multimedia content is stored on the content provider's server database 36. In one embodiment of the present invention, the media content is stored in an encoded, compressed form. One such compression/decompression protocol is MPEG (Moving Pictures Experts Group), which protocol applies to audio/visual works. A common derivative of MPEG for audio works is MP3 (MPEG Audio Layer 3). MP3 allows the download of quality audio from the Web very quickly. Works that are not audio/visual such as text may be compressed and decompressed by a number of commercially available programs such as WinZip™ and PKZip™. It will be clear to those skilled in the art of the present invention that other compression protocols can be used all of which are within the scope of the present invention.

Figure 3:
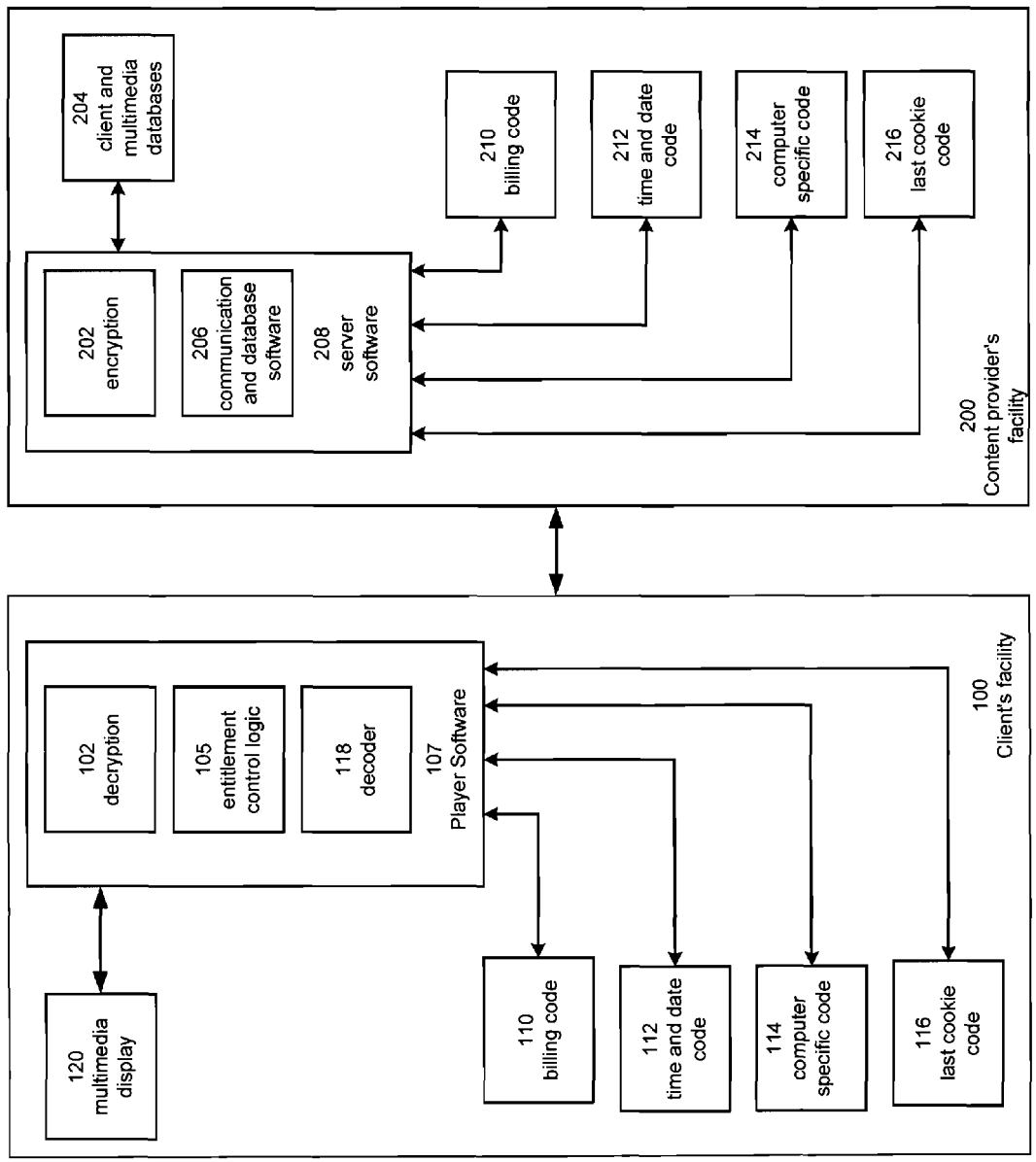
FIG. 3 illustrates the components of the client's facility and the content provider's facility.

As illustrated in FIG. 3, the player software (see, FIG. 1, element 12) includes a decryption module 102 and a decoder 118. For added security the decryption and decoder modules will run with in the same operating system (OS) process. Additionally, the decrypted multimedia bits will not be stored in a shared memory location which can be accessed by another process. For each encoding scheme implemented by the content provider's facility, the client computer (see, FIG. 1, element 10) will have a decoder capable of decoding the multimedia content so as to render it playable by the player software (see, FIG. 1, element 12).

Referring next to FIG. 3, the component codes of the shared private key at the content provider's facility and the component codes at the client's facility are illustrated. The multimedia content is encrypted with an encryption engine 202 using a unique private shared key associated with the player software 12 and client data. By way of illustration and not as a limitation, the shared key may utilize an encryption algorithm as specified by DES, AES, RC2, RC4, Blowfish just to name a few. As illustrated in FIG. 3, four elements are available to both the player and the content provider's server to construct the private shared key: billing code 110/210; time and date code 112/212; computer specific code 114/214; and last cookie code 116/216. The computer specific code and the billing code were shared by the client and the service provider during the initial contact illustrated in FIG. 2. The last cookie code is the cookie delivered to the player with the most recent delivery of multimedia content. If the client has not previously requested any multimedia content, the last cookie code is the initial cookie included in the player software installed on the player. The time and date code is chosen by the client at the time that multimedia content is ordered. Thus, all four codes are known to the client and the content provider at the time an order is completed. As will be illustrated below, these four codes are used to create a shared private key that in turn is used to encrypt the media content prior to delivery to the player.

Client and multimedia databases 204 comprise the client information and the inventory of media that can be distributed (see FIG. 1, elements 34, 36).

The server software 208 comprises multiple elements to affect the system functions. For example, the server software 208 creates the shared keys based on elements 210, 212, 214, and 216. It also provides to the client's facility 100 the player software 107 that allows the client to decrypt and play media in accordance with the digital rights given to the client from the content provider's facility 200. The server software 208 also comprises software 206 that allows the communication between the client facility 100 and the content provider's facility 200 to initially exchange information to establish the client's ability to access media and later for the client to actually request media to be downloaded.

Entitlement control logic 105 of the player software 107 comprises instructions for determining the digital rights that are afforded to a client regarding the media that is downloaded from the server. For example, the client may be limited in the number of times the media may be viewed or the period of time in which the media may be viewed (i.e. date range for example.)

Figure 4:
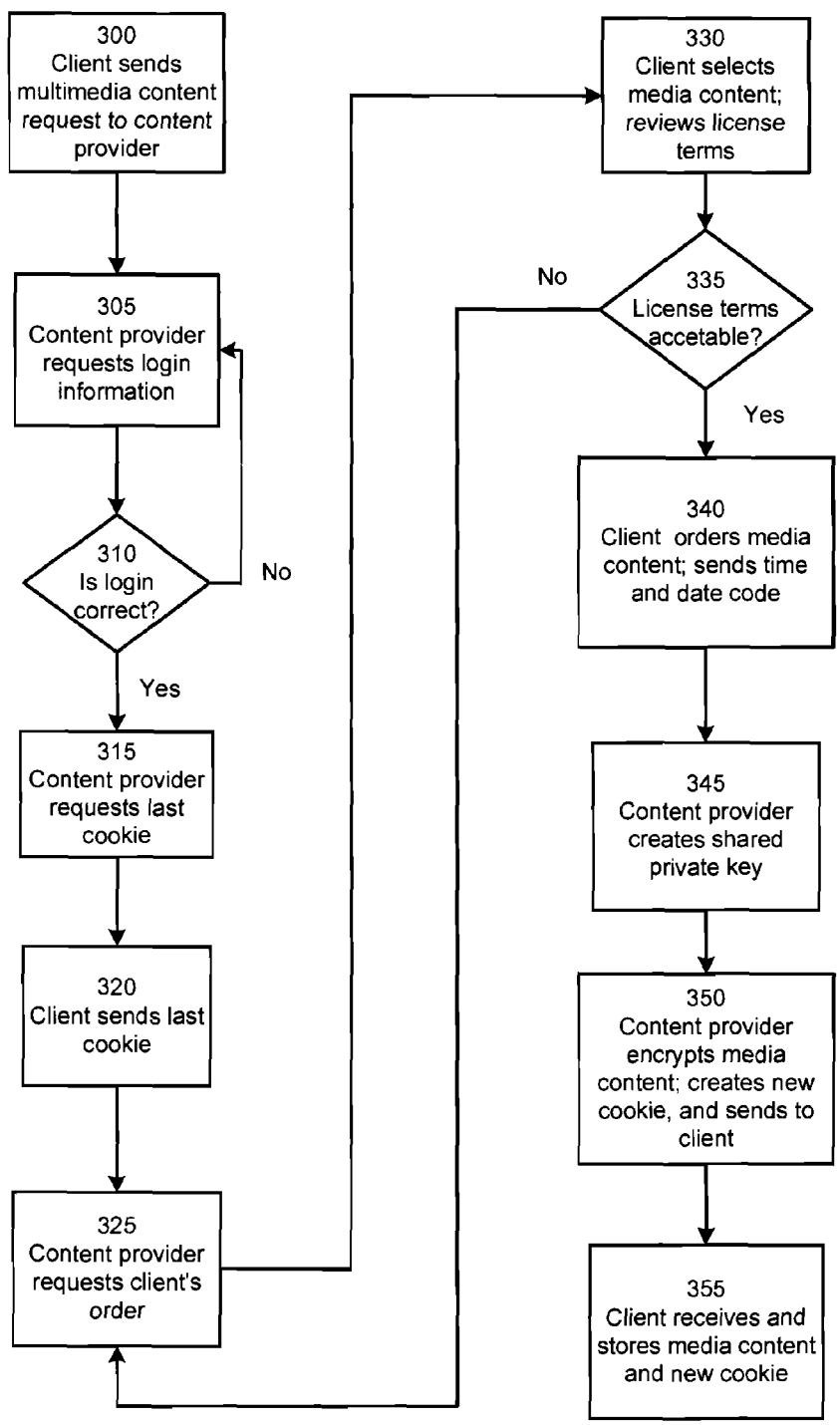
FIG. 4 illustrates the process for requesting multimedia content.

Referring now to FIG. 4, the client computer requests multimedia content from the content provider 300. The content provider requests login information from the client computer 305 and the client computer responds. The content provider checks the information provided by the client computer 310 and determines if the content provider knows the client. If not, the content provider again requests login information from the client. In the preferred embodiment, this loop is limited by a login attempt counter that allows the client a pre-determined number of attempts before the content provider sends additional instructions to the client computer.

Upon successful login by the client computer, the content provider requests the last cookie code from the client computer 315. In the preferred embodiment, the last cookie code is used to authenticate the client computer and to create a shared key. The client computer provides the content provider the last cookie code 320 and the content provider requests the client computer to order media content 325. As would be apparent to one skilled in the art of the present invention, the request to order media content can take many forms without exceeding the scope of the present invention. For example, and not as a limitation, in one embodiment of the present invention, the content provider provides the client computer with a menu of media content. In another embodiment, the client is instructed to search the content provider's media database for content of a specific title.

The client selects media content for download 330 and reviews the license terms associated with that selection 335. If the terms of the license are not acceptable, the client is requested to select again. If the terms are acceptable, the client orders the media content and sends the content provider a time and date code 340. The time and date code establish a point in time that is used to determine the expiration of a time-based license. The time and date code is associated with each selection of media content downloaded by the client at a particular ordering session and is stored in the client database.

The content provider creates a shared private key from the four component codes known to both the content provider and the client computer 345. As previously discussed, at time the order is made, the client computer possesses the computer specific code, the last cookie code, the billing code and the time and date code. During the initial session, the content provider received the billing code and the computer specific code from the client computer. The content provider knows the last cookie code. Upon receipt of the time and date code from the client computer, the content provider is in possession of all four of the component codes. From these component codes, a private key is "shared" by the client computer and by the content provider without actually exchanging the private key.

The content provider encrypts the media content using the shared private key, creates a new cookie, and sends the cookie and the encrypted media content to the client computer 350. In another embodiment of the present invention, the client is offered the option of having the media content delivered a later date or a specific time. If delivery is for a future time, the order data is stored in the client database. When delivery time arrives, the content provider's server checks for a link with the specific client's facility. If a link is not in place, notice is sent to the client computer to start a link.

The client computer receives the media content, associates it with the time and date code provided to the content provider during the ordering session, and stores the media content, date code, the new cookie 355. At this point, the client computer is ready to play the media content via the player software that was previously downloaded.

Figure 5A:
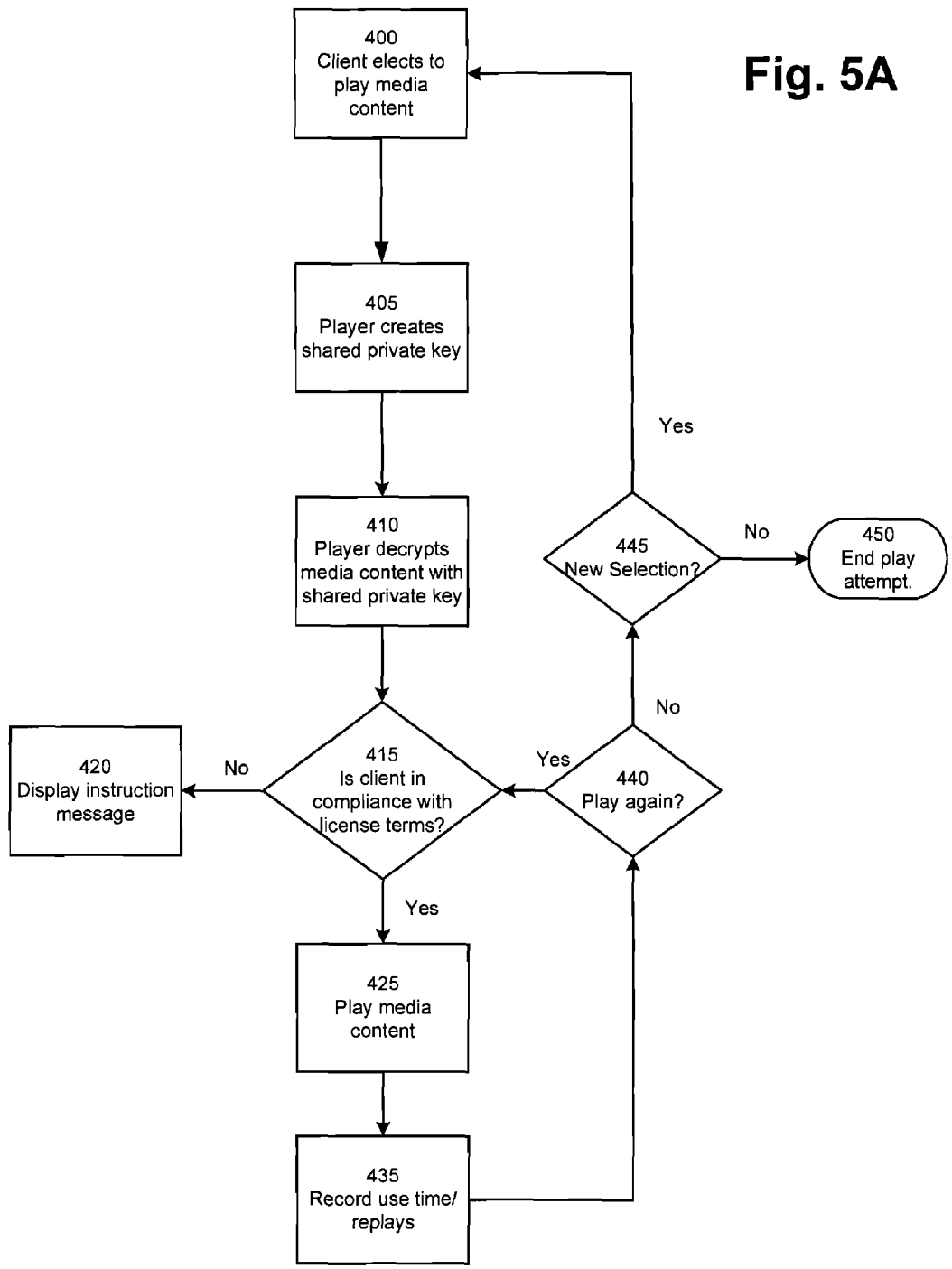
FIG. 5A illustrates the process at a client's facility for playing multimedia content received from the content provider.

Referring to FIG. 5A, the playing of the media content is illustrated. When the client elects to play the media content 400, the client invokes the player software. The player software creates the client's copy of the shared private key 405 from the same four component codes used by the content provider to create the key. The player software then decrypts the media content using the shared private key 410 and the player software checks to determine if the client is in compliance with the license terms 415.

As noted previously, the player software includes a checking algorithm incorporated in entitlement and control logic. In another embodiment, the specific checking algorithm for a particular title of media content is appended to the multimedia content and installed as a plug-in for use by the player software. The checking algorithm utilizes the individual component codes to enforce specific license restrictions imposed on the playing of the multimedia content (time of use, number of plays) and on the player on which the multimedia content is played (where illicit copies of the multimedia content are non-playable on other than the designated player). If the checking algorithm determines that the client is not in compliance with the license terms, a message is displayed to the client 420. For example, a client who has pre-paid for usage of media content may not have sufficient funds to play the media content. In this case, the message directs the client to replenish his or her account. If the checking algorithm determines that the copy of the media content has been pirated, the message takes the form of a warning relating to the unauthorized use of the media content.

The time and date code 112 component of the private key code identifies the time and date the order for the multimedia content was made. One embodiment uses the last cookie code 116 in conjunction with the time and date code 112 component. Information may include time and date of the multimedia content download, terms of the use license and unique device data such as Internet address. The use license time limitation data can be found in the cookie and is used, in conjunction with the time and date code and the entitlement and control logic, to restrict playing of the multimedia content to the contractual time period.

The cookie code can also be used to check the user id and Internet protocol (IP) address to confirm that the multimedia content is being played on the device that is licensed to play the multimedia content. These data are readily available in the last cookie data returned to the content provider during the ordering process.

A pay per play license may be controlled through the billing code 110 component of the private key. The billing code 110 contains information about a payment method. In the preferred embodiment, the payment method is a credit card, but the invention is not so limited. In another embodiment, the payment method is an ACH transfer from a bank account. In yet another embodiment, a pre-paid account is established containing a credit amount with the billing code. An alternative embodiment establishes a pre-paid account in the cookie file. Before the multimedia content is decrypted, the credit account is checked using the entitlement and control logic to confirm there is sufficient reserve to pay the license fee associated with the multimedia content. The license fee is subtracted from the credit amount in accordance with the payment scheme of the license. By way of illustration, where the license fee is time based, the credit amount is decremented for each time unit the multimedia content is played. Where the license fee is used based, the credit amount is decremented each time the multimedia content is played.

If the client is in compliance with the terms of the license, the media content is decrypted and played on the player software 425 and time and/or the completion of a play cycle is recorded 435. The client is asked if a replay is desired 440. If replay is desired, checking algorithm again determines if the client is in compliance with the license terms 415. If replay is not desired, the client is asked if he or she want to play another selection of media content 445. If another selection is desired, the process begins again 400. If not, play is ended at 450. The player software does not permit storage of the decrypted media. Thus when media is initially downloaded for later playback, the media is stored in encrypted format. Thus an alternate process for playback is for the player software to first determine in the client is in compliance with license terms and conditions. If this is the case, the player software will then create the necessary keys and decrypt the encrypted media for viewing the client's display screen.

Figure 5B:
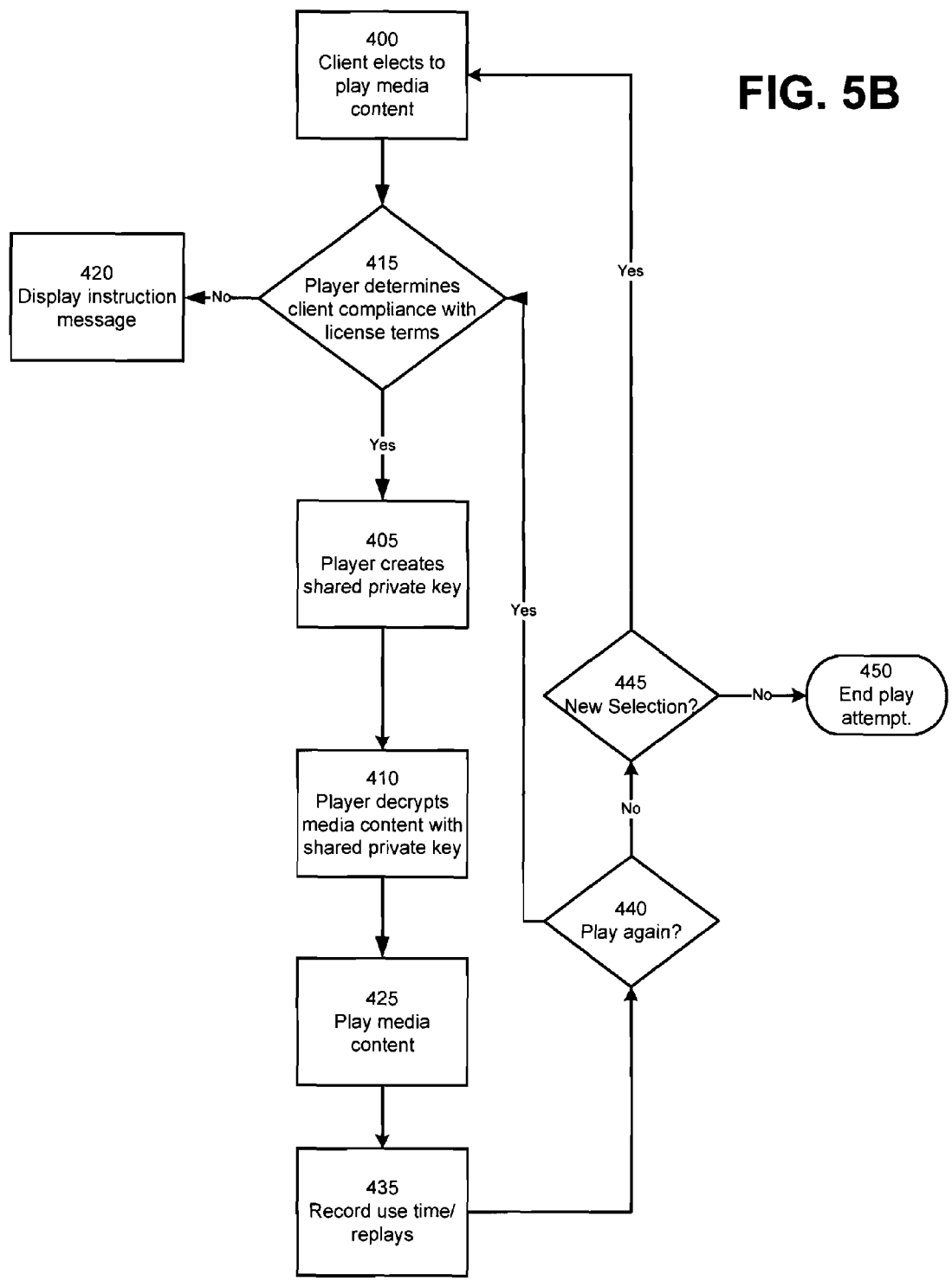
FIG. 5B illustrates and alternative process for playing multimedia content received from a content provider

For example, referring to FIG. 5B, an alternate playback process is illustrated. In this process the client elects to play the stored and encrypted media 400. The player software is invoked and determines if the client is in compliance with the license terms 415. This can be established since the player software keeps track of the number of times the media has been played and other restrictions on playback. If the user is not in compliance, the player displays an appropriate instruction to the client for display 420 such as denial of playback or other instructions for retrieving the desired media.

If the client is in compliance with license terms, the player software then creates the shared private key 405 decrypts the content 410 and plays the media 425. The player software then records the time or number of replays or other restrictive data for later permissions. The process then continues according to the description of FIG. 5A.

In another embodiment of the present invention, the anti-piracy aspects of the present invention are enhanced by introducing additional data elements into the multimedia content. By introducing the additional data elements into selected bytes or tracks of the multimedia content, the error correction schemes associated with playback of multimedia content will preclude the additional data elements from affecting the play of the multimedia content. By associating a particular set of additional data elements with the multimedia content distributed to a particular client, the additional data elements can be used as a "fingerprint" to identify the source of pirated copies of the multimedia content.

A system and method for multimedia content rental and distribution system that protects the intellectual property rights of the holder using unique data from the player has now been illustrated. It is important to note that while a particular utilization of the specific DES private key component codes were described in the preferred embodiment, this is not meant as a limitation. For example decryption may be done with other combinations of the private key component codes or other elements associated with the player. There may be different component codes, not described here, used to develop the private key. Other encryption algorithms also exist now such as RC2, RC4, Blowfish and a host of others both existing now and in the future that will satisfy the requirements for encrypting and decrypting the multi media content. The present invention would be equally effective with any subset of component codes comprising the encryption-decryption private key. Further, while multimedia content is discussed, this is also not meant as a limitation. For example, single media such as audio alone, video alone, non-moving text and graphics are also deemed to be within the scope of the invention as disclosed. When the present invention is used with such material, enhanced protection can be obtained for musical recordings, reports, graphics and artwork as well. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular

What is claimed is:

1. A method for securing intellectual property distributed electronically, comprising:
    establishing contact between an intellectual property provider server (IP Server) and a client, wherein at least two component codes are shared and pre-stored in both the client and the server prior to ordering the intellectual property and wherein the shared and pre-stored component codes are exchanged over a network;
    ordering an intellectual property product from the IP server;
    the IP server creating a shared private key based on the pre-stored shared component codes and an additional shared component code at the time the intellectual property product is ordered and wherein the shared private key is not distributed to the client;
    encrypting the intellectual property product with the shared private key prior to distribution to the client, and wherein the intellectual property product further comprises content data and rights data in digital form;
    receiving the intellectual property product at the client;
    storing the encrypted intellectual property product on the client;
    creating the shared private key by player software at the client using a combination of the pre-stored shared component codes and the additional shared component code determined at the time the intellectual property product is ordered, the player software further comprising a player data record and wherein the player data record comprises the pre-stored shared component codes and the additional shared component code determined at the time the intellectual property product is ordered;
    decrypting the intellectual property product with the created shared private key;
    comparing the rights data and the player data record to determine entitlement to play the content data; and
    playing the content data on the player software if entitlement to do so has been determined.

2. The method for securing intellectual property of claim 1, wherein
    the client is one of a computer, a smart television, an MP3 player, a VCR, a set-top box, a personal digital assistant, and a satellite receiver.

3. The method for securing intellectual property of claim 1, wherein
    the rights data comprises a player identifier, wherein the player data record further comprises a player specific identifier unique to the player, and wherein comparing the rights data and the player data record to determine entitlement to play the content data comprises determining that the player identifier and the player specific identifier are the same.

4. The method for securing intellectual property of claim 1, wherein
    the rights data comprises a number of plays limit, wherein the player data record further comprises a number of plays counter, and wherein comparing the rights data and the player data record to determine entitlement to play the content data comprises determining that the number of plays counter does not exceed the number of plays limit.

5. The method for securing intellectual property of claim 1, wherein
    the rights data comprises an end of play time, wherein the player data record further comprises a current time, and wherein comparing the rights data and the player data record to determine entitlement to play the content data comprises determining that the current time is not after the end of play time.

6. The method for securing intellectual property of claim 1, wherein
    the rights data comprises a last date, wherein the player data record further comprises a current date, and wherein comparing the rights data and the player data record to determine entitlement to play the content data comprises determining that the current date is not after the last date.

7. The method for securing intellectual property of claim 1, wherein
the component codes are selected from the group consisting of a billing code, a player code in the form of a player identifier, and a combination thereof.

8. The method for securing intellectual property of claim 1, wherein
the additional shared component code includes at least one of a time and date code, a last cookie code, and a combination thereof.

9. The method for securing intellectual property of claim 8, wherein
the component codes include at least one of a billing code, a player code in the form of a player, and a combination thereof.

10. The method for securing intellectual property of claim 9, wherein
the private key is created using a billing code, a player code, a time and date code, and a last cookie code.

11. A system for securing intellectual property distributed electronically, comprising:
an intellectual property provider server (IP Server) connected to a network; and
a client connected to the network, the client including
a processor,
player software,
a storage device connected to the processor, and
memory, the storage device bearing a player data record, the player data record including at least two component codes that have been shared with the IP server during an earlier communication, and an additional component code determined at a time an intellectual property product is ordered from the intellectual property server, wherein
the IP server is configured to
create a shared private key based on the pre-stored shared component codes and an additional shared component code at the time the intellectual property product is ordered, wherein the shared private key is not distributed to the player software,
encrypt the intellectual property product with the shared private key prior to distribution to the player software, the intellectual property product further including content data and rights data in digital form, and
the player software when executed on the client, causes the client to
receive over the network the intellectual property product ordered by the client,
store the intellectual property product in the storage device in encrypted form,
create the shared private key using a combination of the pre-stored shared component codes and the additional shared component code determined at the time the intellectual property product is ordered,
compare the rights data and the player data record to determine entitlement to play the content data
decrypt the intellectual property product with the created shared private key, and
play the content data on the player software if entitlement to do so has been determined.

12. The system for securing intellectual property of claim 11, wherein
the client is one of a computer, a smart television, an MP3 player, a VCR, a set-top box, a personal digital assistant, a cell phone, and a satellite receiver.

13. The system for securing intellectual property of claim 11, wherein
the rights data comprises a player identifier, wherein the player data record further comprises a player specific identifier unique to the player, and wherein the player software comprises instructions for comparing the rights data and the player data record to determine entitlement to play the content data comprises instructions for determining that the player identifier and the player specific identifier are the same.

14. The system for securing intellectual property of claim 11, wherein
the rights data comprises a number of plays limit, wherein the player data record further comprises a number of plays counter, and wherein the software instructions for comparing the rights data and the player data record to determine entitlement to play the content data comprises instructions for determining that the number of plays counter does not exceed the number of plays limit.

15. The system for securing intellectual property of claim 11, wherein
the rights data comprises an end of play time, wherein the player data record further comprises a current time, and wherein the software instructions for comparing the rights data and the player data record to determine entitlement to play the content data comprises instructions for determining that the current time is not after the end of play time.

16. The system for securing intellectual property of claim 11, wherein the rights data comprises a last date, wherein the player data record further comprises a current date, and wherein the software instructions for comparing the rights data and the player data record to determine entitlement to play the content data comprises instructions for determining that the current date is not after the last date.

17. The system for securing intellectual property of claim 11, wherein
the at least two component codes include at least two of a billing code, a player code in the form of a player identifier, and a combination thereof.

18. The system for securing intellectual property of claim 17, wherein
the additional component code determined at the time the intellectual property product is ordered includes at least one of a time and date code, a last cookie code, and a combination thereof.

19. The system for securing intellectual property of claim 17, wherein
the private key is created using a billing code, a player code, a time and date code, and a last cookie code.

20. A method for securing intellectual property distributed electronically, comprising:
establishing contact between an intellectual property provider server (IP server) and a client wherein at least two component codes are shared and pre-stored in both the player software and the server prior to ordering the intellectual property;
ordering an intellectual property product from the IP server;
the IP server creating a shared private key based on the pre-stored shared component codes and an additional shared component code at the time the intellectual property product is ordered and wherein the shared private key is not distributed to the player software; and encrypting the intellectual property product with the shared private key prior to distribution to the client, and wherein the intellectual property product further comprises content data and rights data in digital form;

receiving the intellectual property product at the client;

storing the intellectual property product on the client in encrypted form, the client further comprising a player downloaded at the time of the initial communication between the client and the IP server, the player comprising a player data record and wherein the player data record comprises the pre-stored shared component codes and the additional shared component code determined at the time the intellectual property product is ordered;

the player creating the shared private key using a combination of the pre-stored shared component codes and the additional shared component code determined at the time the intellectual property product is ordered; and decrypting the intellectual property product with the created shared private key; and playing the decrypted content data on the player software.

21. The method for securing intellectual property of claim 20, wherein the shared private key is created using component codes in the form of a billing code, a player code, a time and date code, and a last cookie code.

* * * * *